April 7, 1925.
P. BASTIEN
BRAKING MECHANISM
Filed Sept. 15, 1922
1,532,644
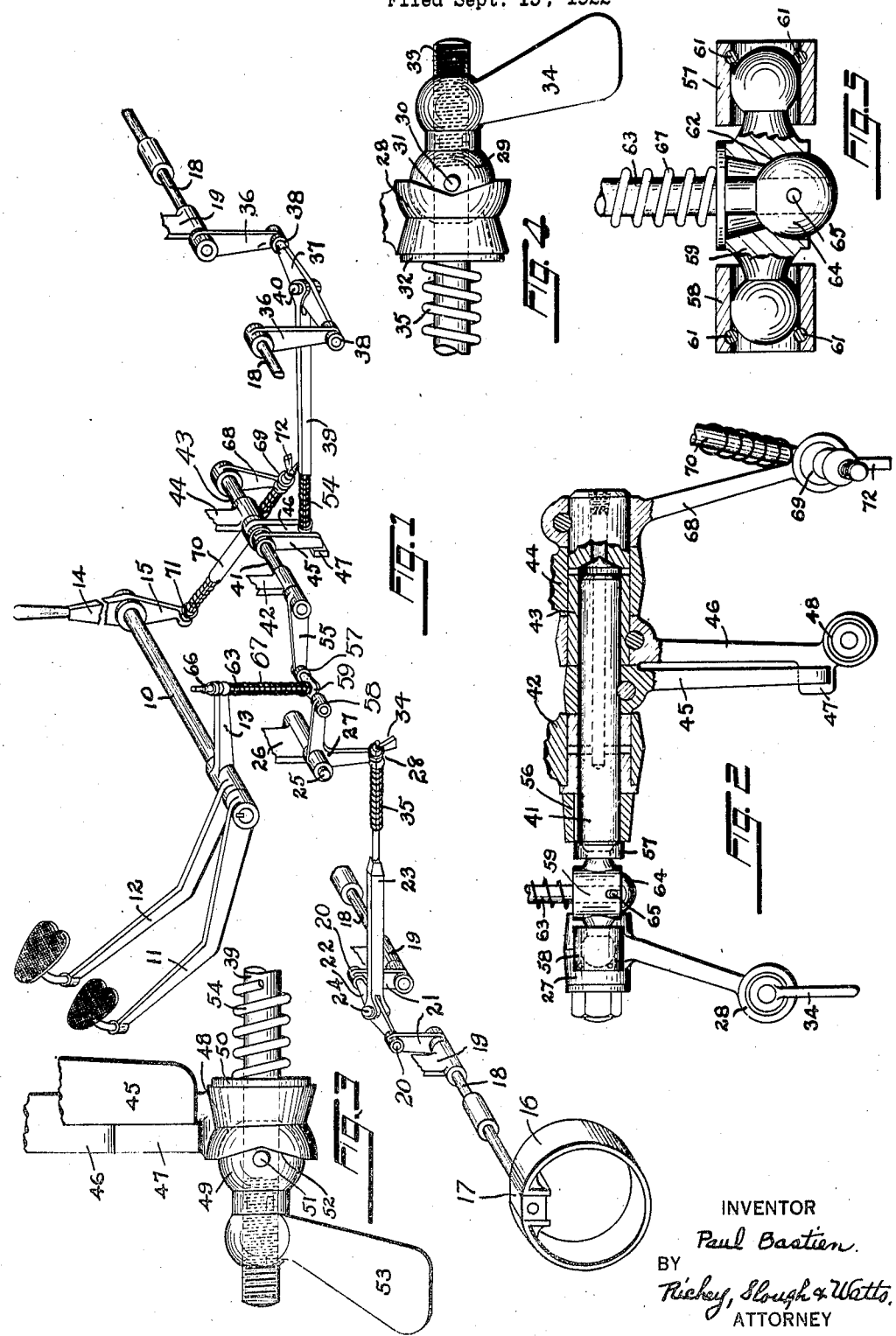
INVENTOR
Paul Bastien.
BY
Richey, Slough & Watts,
ATTORNEY

Patented Apr. 7, 1925.

1,532,644

UNITED STATES PATENT OFFICE.

PAUL BASTIEN, OF CLEVELAND, OHIO, ASSIGNOR TO THE RUBAY COMPANY, OF CLEVELAND, OHIO, A CORPORATION.

BRAKING MECHANISM.

Application filed September 15, 1922. Serial No. 588,415.

*To all whom it may concern:*

Be it known that I, PAUL BASTIEN, a citizen of the Republic of France, residing at Cleveland, in the county of Cuyahoga and State of Ohio, have invented a certain new and useful Improvement in Braking Mechanism, of which the following is a full, clear, and exact description.

This invention relates to braking mechanism for vehicles, and more particularly to vehicles which are provided with front and rear sets of brakes.

One object of my invention is to provide mechanism whereby either one of the sets of brakes can be operated separately, or both sets of brakes can be operated substantially simultaneously.

Another object of my invention resides in connecting two operating levers to the braking mechanism, or portions thereof, whereby one lever will operate both sets of brakes simultaneously and the other lever will operate only one set of the brakes.

Another object of my invention resides in providing adjusting mechanism for the two sets of braking mechanism, to allow a single operating lever to apply the sets of brakes either simultaneously, or successively.

Another object of my invention resides in providing a coupling between the front and the rear sets of brake operating mechanisms, and the relation of a lever with the coupling for operating both sets of brakes.

In the drawings Fig. 1 is a perspective view of the general assembly of my braking mechanism;

Fig. 2 is an end view, partially in section, of the transverse shaft which operates the mechanism for expanding the rear set of brakes;

Fig. 3 is a fragmentary side elevation of the mechanism connecting the transverse operating shaft and the rod operating the rear brake expanding mechanism;

Fig. 4 is a side elevation of front operating rod and the connection therewith of the bell crank lever for operating the same; and Fig. 5 is a sectional view of the coupling connecting the front and rear brake operating mechanisms.

Referring to the drawings, I have shown the braking mechanism and only one brake, but it is to be understood that the disclosure is attached to a chassis and extends thereunder to the front and rear brakes, which are expanded thereby within the brake drums on the front and rear wheels of a road vehicle.

A shaft 10 extends transversely of and is rotatably secured to the chassis of a road vehicle and has keyed thereto, a foot lever 11 which operates a clutch mechanism which is connected to the shaft. A foot lever 12 is rotatably mounted on the shaft and has a rear extension 13 which is apertured for reasons hereinafter described. A hand lever 14 is rotatably mounted on the shaft 10 and has a downwardly extending portion 15 which is apertured for reasons hereinafter described.

There are two sets of brakes, front and rear, each set consisting of two brakes of a conventional expanding type, such as shown at 16, which co-operate with the brake drums carried by the front and rear wheels. The brakes are each expanded by the rotation of a spreader 17 which is secured on an end of each of the shafts 18. These spreader shafts extend transversely and are rotatably mounted in brackets 19 depending from the chassis. The adjacent spaced ends of the shafts 18 which operate the front brakes each have an arm 21 secured thereto which are provided with a bearing 20 at their ends. A compensating lever 22 extends between, and has its ends journalled in the bearings 21 of the arms.

A rod 23 is pivoted, substantially centrally at 24, to the compensating lever 22 and extends rearwardly to a point substantially under the rearward extension of the foot lever 12. A shaft 25, is carried by a bracket 26 depending from the chassis, and a bell crank lever 27 is rotatably secured on the end thereof. The downwardly extending portion of the bell crank lever is provided with an enlarged end 28, as shown in Fig. 4 having adjoining hollow sockets at each end. A centrally slotted ball member 29 extends within one of the sockets in the enlarged end 28, and is provided with pins 30 which extend from opposite sides thereof and are adapted to lie within depressions 31 in the end wall of the socket. A beveled washer 32 extends into the other socket in the enlarged head 28, and the threaded end 33 of rod 23 extends through the washer, the sockets, and the hollow ball member. A wing nut 34 is screwed on the end of shaft

23, and abuts the ball member 29. By adjusting the wing nut on the rod, the time of the engagement of the bell crank lever can be regulated. A coil spring 35 is secured at one end to the shaft 23, and abuts the washer 32 at its opposite end allowing a certain amount of tension in applying the brakes, to prevent grabbing.

When the bell crank lever is rocked upward on its shaft, the enlarged end 28 is moved rearward and the socket engaging the ball 29, which abuts the wing nut 34, moves the rod 23 rearward. This rearward motion extends to the compensating lever 22 and rotates the arms 21, which in turn, rotate the shafts 18 and the spreaders 17, expanding the brakes. The spring 35 normally tends to keep the socket in engagement with the ball member 29.

The rear brake spreader shafts 18, each have a depending arm 36 secured to their inner ends, and the arms are connected by a compensating lever 37 journalled at each end, in an aperature 38 in the lower end of the arms. A forward, longitudinally extending rod 39 is pivoted to the compensating lever centrally thereof at 40, and the opposite end of the rod is threaded.

A transverse shaft 41 is rotatably journalled at one end in a bracket 42, depending from the chassis, and at the opposite end in a hollow shaft 43, which is rotatably mounted in a bracket 44, depending from the chassis. An arm 45 is keyed to the rotatable shaft 41 and an arm 46 is keyed adjacent thereto on the hollow shaft 43. Both arms extend downwardly, when not in operation and the arm 46 is provided with a side extension 47 which projects under the arm 45. The threaded end of the rod 39 extends through an enlarged end 47 of the arm 46. This enlarged end is provided with adjoining hollow sockets, one of which receives a centrally slotted ball member 49 and the other receives a beveled washer 50. The ball member is provided with oppositely extruding pins 51 which lie in opposite recesses 52 in the end wall of the enlarged end 48. A wing nut 53 screws on to the threaded end of the rod 39 and abuts the ball 49. A coil spring 54 is secured at one end to the rod 39 and bears against the washer 50 at its opposite end. This rod extends through the sockets, the ball member and the washer, and when pushed forward by a forward movement of the arm 46, will function to rotate the spreader arms in a manner, similar to that described with respect to the front brake operating mechanism.

An arm 55 is secured by a key 56 on the end of shaft 41 and is provided at its opposite end with an enlarged apertured end 57, as shown in Fig. 5. The upper arm of the bell crank lever 27 is provided with an enlarged apertured end 58, which is in alignment and adjacent the end 57 of the arm 55. A coupling member 59 is provided with round ends 60, which extend into the enlarged ends of the upper bell crank arm 70 and the arm 55, and are retained therein by pins 61. The coupling 59 is provided with a central vertical aperture therethrough the lower portion of which is in the form of a socket 62. A vertical rod 63 extends through the coupling and is provided at its end with a ball 64 which fits within the socket 62 and is retained therein by a pin 65. The rod is threaded at its opposite end and extends through the apertured end in the foot lever extension 13. A wing nut 66 is screwed on the end of the rod and a coil spring 67 is interposed between the lever extension 13 and the coupling.

By pressing upon the foot lever 12, the extension 13 is moved upward and the rod 63 and coupling 59 are raised upward thereby. The coupling when raised rocks the bell crank 27 and the arm 55 upward. This movement of the bell crank pulls the rod 23 rearwardly, as previously described, to operate the front set of brakes. The rear set of brakes are operated by the movement transmitted from the arm 55, to the shaft 41 which pulls the rod 39 forwardly when the arm 45, carried by the shaft 41, engages the extension 47 on the arm 46.

An arm 68 is secured to the end of hollow shaft 43 which extends through the bracket 44 and is provided with an enlarged end 69, similar to that shown in Figs. 3 and 4. A rod 70 is secured at one end 71, to the apertured end 15 of the hand lever, and extends through the enlarged end 69 of the arm 68, at its opposite end. A wing nut 72 screws on to the threaded end of the rod 70 and provides an adjustable abutment for the rod. When the hand lever 14 is rocked back, the extension 15 moves forward drawing the rod 70 and the arm 68 forward, due to the engagement of the wing nut 72 with the enlarged end thereof. The arm 68 being secured to the hollow shaft 43 rotates the shaft which swings the arm 46 secured thereto forwardly, moving the rod 39 with it, which in turn moves the compensating lever 37, rotating the spreader mechanism. It will be seen that this mechanism just described can be operated independent of the front brake mechanism and can be applied when it is desired to brake only the rear wheels.

Normally the wing nuts 34 and 53 are positioned on rods 23 and 39 so that the front and rear sets of brakes will be operated substantially simultaneously, but if desired, the sets of brakes can be operated successively by changing the position of one or both of the wing nuts.

It is obvious that various changes can be made in the details of my invention as shown, within the spirit of my invention and the scope of the appended claims.

What I claim is:

1. Brake applying mechanism for vehicles, comprising brakes for the front and rear wheels of a vehicle, separate mechanisms for actuating the front and rear sets of brakes, manually operable levers for each of said mechanisms, a pair of aligned shafts rotatable relative to each other, one of said actuating mechanisms being connected to one of said shafts and the other of said actuating mechanisms being connected with the other of said shafts, and means adapted to couple said shafts together for actuating said mechanisms in unison when one of said levers is operated, said means permitting independent rotation of one of said shafts for actuating only one of said mechanisms when the other of said levers is operated.

2. Brake applying mechanism for vehicles, comprising brakes for the front and rear wheels of a vehicle, separate mechanisms for actuating the front and rear sets of brakes, manually operable levers for each of said mechanisms, a pair of telescopic shafts rotatable relative to each other, one of said actuating mechanisms being connected to one of said shafts and the other of said actuating mechanisms being connected to the other of said shafts, and means for coupling said shafts together for actuating said mechanisms in unison when one of said levers is operated, said means permitting one of said shafts to be rotated separately by the other of said levers to operate only one of said actuating mechanisms.

3. Brake applying mechanism for vehicles, comprising brakes for the front and rear wheels of a vehicle, separate mechanisms for actuating each front and rear set of brakes, aligned relatively rotatable shafts each having one of said mechanisms operatively connected therewith, a hand lever secured to one of said shafts, a foot lever attached to the mechanism connected to the other of said shafts, and means coupling said shafts for rotation in unison when said foot lever is operated, said means permitting rotation of the shaft to which said hand lever is secured to independently operate the actuating mechanism attached thereto.

4. Brake applying mechanism for vehicles, comprising brakes for the front and rear wheels of a vehicle, separate mechanisms for actuating the front and rear sets of brakes, a shaft, manually operable levers for each of said mechanisms carried by said shaft, a pair of aligned shafts rotatable relative to each other, one of said actuating mechanisms being connected to one of said aligned shafts and the other of said actuating mechanisms being connected with the other of said shafts, cooperating means extending from said aligned shafts for coupling said shafts together to actuate said mechanisms in unison when one of said levers is operated, said cooperating means permitting independent rotation of one of said shafts to actuate only one of said mechanisms.

5. Brake applying mechanism for vehicles, comprising brakes for the front and rear wheels of a vehicle, separate mechanisms for actuating each front and rear set of brakes, aligned relatively rotatable shafts each having one of said mechanisms operatively connected therewith, a hand lever connected to operate one of said mechanisms, adjacent arms extending from said aligned shafts, one of said arms being bent to extend transversely of the other of said arms, the operation of said lever causing one of said arms to engage the other arm and rotate said aligned shafts together to actuate both of said mechanisms in unison, and a lever secured to one of said aligned shafts to operate the mechanism attached thereto independently of the other of said mechanisms.

In testimony whereof, I hereunto affix my signature.

PAUL BASTIEN.